Sept. 23, 1969   F. P. WILLCOX   3,469,124
MULTISTAGE IMPULSE-OPERATED ROTARY STEPPING MOTOR
Filed April 15, 1968   2 Sheets-Sheet 1

INVENTOR
F. P. WILLCOX
BY
Homer R. Montague, ATTORNEY

Sept. 23, 1969　　　　F. P. WILLCOX　　　　3,469,124
MULTISTAGE IMPULSE-OPERATED ROTARY STEPPING MOTOR
Filed April 15, 1968　　　　　　　　　　2 Sheets-Sheet 2
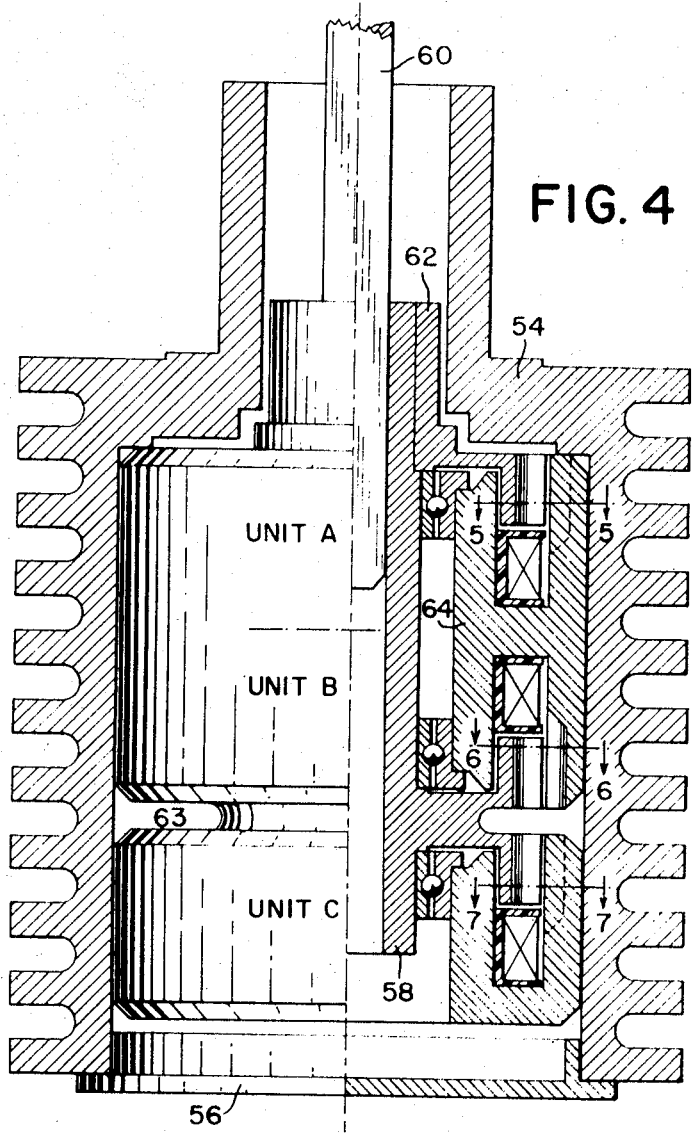
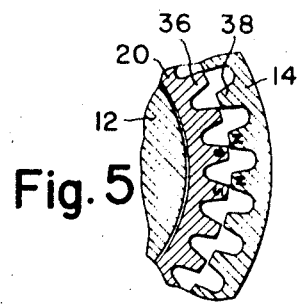
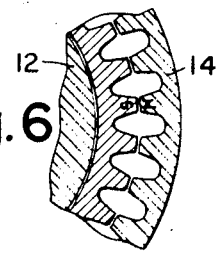
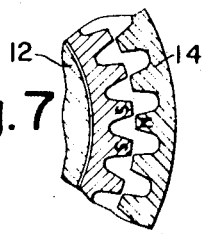
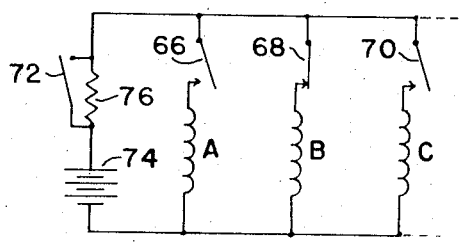
INVENTOR
F. P. WILLCOX
BY
Homer R. Montague, ATTORNEY United States Patent Office 3,469,124
Patented Sept. 23, 1969

3,469,124
MULTISTAGE IMPULSE-OPERATED ROTARY
STEPPING MOTOR
Frederick Preston Willcox, 565 Oenoke Ridge,
New Canaan, Conn. 06840
Filed Apr. 15, 1968, Ser. No. 721,355
Int. Cl. H02k 37/00
U.S. Cl. 310—49    12 Claims

ABSTRACT OF THE DISCLOSURE

An electric rotary motor for precise control by series of electric impulses to drive, brake and accurately position-index multi-position rotary elements such as the type font wheel or drum of a printer or typewriter, or for powering carriage drive, paper feed and the imprinting action of such apparatus. A magnetically permeable stator has an annular groove or opening within which is received a simple solenoid winding and the permeable rim of a low-inertia rotor shell. The inner adjacent faces of the rotor rim and the stator groove are cylindrical and very closely spaced, while their outer faces are toothed to provide in effect a single segmented working flux gap consisting of a plurality of inter-tooth gaps that are magnetically in parallel. Several of these rotor-stator units are coupled by a common rotor shaft in tooth-offset arrangement for control of direction of rotation, braking, indexing and the like. Full acceleration is obtained from a few pulses of the solenoid, which may be followed by braking and position-indexing under similar power pulse control.

BACKGROUND OF THE INVENTION

Known precision-position motors of the "stepping" type require excessive drive power due to ineffecent magnetic circuits with multiple series air-gaps, or the use of permanent magnet rotors that produce excessive rotor drag. Most known motors of this type also require complicated winding and commutating or switching arrangements which may become prohibitive where a large number of discrete stopping positions must be selected.

SUMMARY OF THE INVENTION

The invention eliminates the need for all permanent magnets, and each rotor-stator unit uses a single solenoid winding received in an annular space, recess or "well" defined between inner and outer rings of an effectively integral stator body. The multiple- (at least double-) series working air gaps of prior motors are replaced by a single segmented working-gap arrangement (per rotor-stator unit), consisting of the parallel combination of the gaps resulting from the confronting toothed formations on the inward-facing surface of the outer stator ring and the outward-facing surface of the rim of the rotor. The confronting inward-facing surface of the rotor rim and outward-facing surface of the inner stator ring are smoothly cylindrical and are very closely spaced, to minimize the reluctance of this "non-working" gap. This single working gap arrangement greatly reduces the reluctance of the magnetic circuit and improves the torque that can be obtained with a given excitation; in other words, the magnetic circuit is very efficient, and the rotor can be accelerated to speed under low loads by only a few pulses of solenoid current.

A single unit as just described does not facilitate simple impulse control of direction of rotation, or reverse-torque braking. The invention contemplates a combination of two or (preferably) three such units, which are identical except that the rotors are connected, as by a common shaft, and the stators are also interconnected, with the rotor-stator tooth alignments staggered or offset amongst the units. The sequence in which the different solenoid windings are pulsed then provides the desired directional control as well as reverse-torque braking and indexing. Holding the rotor shaft in a final indexed position is easily achieved by passing a moderate steady holding current through one of the windings. Normally, the control of switching of winding currents will be digital in nature, on a pulsed basis with feedback control from a load-position sensing arrangement to provide full servo operation, including control of the period of acceleration in accordance with the magnitude of the travel distance (angle) required. In principle, however, manual control of the sequence of winding pulses is entirely feasible.

As a power actuator device (apart from the digital servo type of rotational position control described above), the motor of the invention provides an extremely high power-capability in comparison with its small size and weight, due largely to the great efficiency of its single-working-gap design and lumped solenoid windings.

BRIEF DESCRIPTION OF THE DRAWING

FIG. 4 is a central vertical sectional view of a motor comprising three rotor-stator units of the invention.

FIG. 5 is a fragmentary sectional view taken on line 5—5 of FIG. 4.

FIG. 6 is a similar view taken on line 6—6 of FIG. 4.

FIG. 7 is another similar view taken on line 7—7 of FIG. 4.

FIG. 8 is a simplified schematic diagram showing the energization of the solenoid windings of the motor of FIG. 4.

DESCRIPTION OF THE PREFERRED EMBODIMENTS

Figure 1:
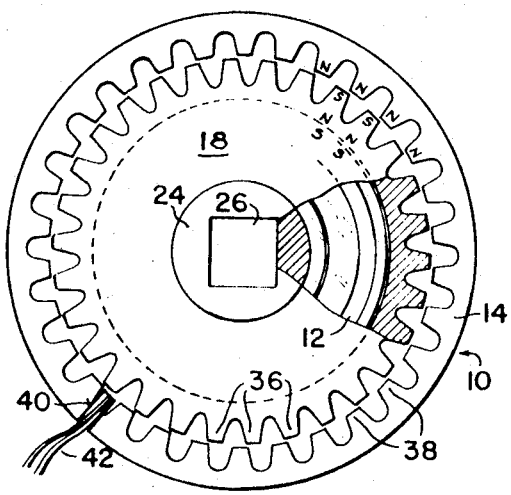
FIG. 1 is a plan view of a single rotor-stator unit according to the invention, with a portion of the rotor broken away to show underlying parts.
Figure 2:
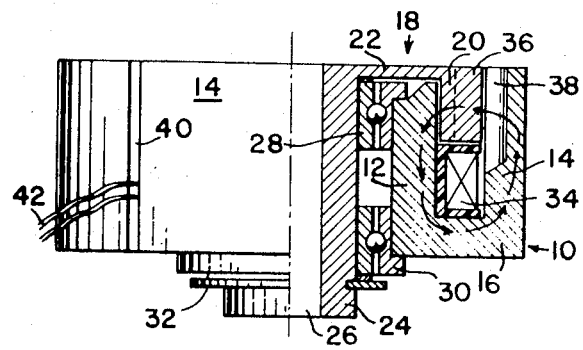
FIG. 2 is a vertical quarter-section view of the FIG. 1 unit.

The design considerations which result in extremely low rotor inertia, highly efficient magnetic structure, winding simplicity, and high ratio of power to size or weight, can best be appreciated by study of a single rotor-stator unit such as is illustrated in FIGS. 1 and 2 of the drawings. This single unit exhibits motor action in either direction, depending upon the angular orientation of the rotor and stator at the commencement of the first drive impulse. As will appear below, complete starting and stopping control can preferably be achieved by a multi-unit construction, but for the purposes of initial understanding, description of a single unit will suffice. In the form illustrated in FIGS. 1 and 2, a physical embodiment had a diameter of ⅞ inch and an axial length of 0.350 inch, the rotor and stator each having 30 teeth.

This unit produced a stall torque of 6 pound-inches with a magnetic excitation of 350 to 400 ampere-turns per inch, and would run as a synchronous motor with input pulses at rates up to 2500 Hz., with either shaped-pulse, square wave, or half- or full-wave A.C. (sinusoidal) inputs. In applications such as rotor-positioning, where less than a full rotation is involved between successive selected positions, three such elements ganged together will bring a typical driven member up to a speed of 1800 r.p.m. with the application of only 3 sequential pulses and, of course, will stop the element with the application of 3 pulses applied in reverse order. With 30 teeth per rotor-stator unit, this ganged assembly provided 90 discrete and very positively-indexed positions, and, as indicated above, full speed is attainable within a very small fraction of a turn.

Turning now to FIGS. 1 and 2, numeral 10 designates the cup-like stator body, of magnetically soft, permeable material such as soft iron, having an annular recess between an inner ring 12 and an outer ring 14 which are connected at the bottom of the unit (FIG. 2) by the section 16. The rotor unit 18, formed of similar material, has an outer rim or shell 20 and a thin circular web portion 22 which connects the rim to a central bushing portion 24 having, for example, a square hole 26 to receive an output shaft or drive connection not shown in these figures. The bushing portion is journalled in the stator as by bearings 28 and 30. A retaining C-ring 32 may be provided to hold the parts assembled, or the bearings may perform this function.

Received and suitably secured within the lower portion of the annular recess or well between stator rings 12 and 14 is a simple solenoid winding 34 which may be on a bobbin. The upper portion of the same well is mainly occupied by the rotor rim or shell 20, whose smoothly cylindrical inward-facing surface is spaced a minimal clearance amount, such as 0.001 inch, from the smoothly cylindrical outward-facing surface of the inner stator ring 12, to provide minimal reluctance at this non-working airgap. The outward-facing surface of the rotor rim or shell 20 is formed with a plurality of teeth 36, herein 30 in number, evenly spaced about the rotor's periphery, and separated by grooves having a depth typically 1.5 times the face width of the teeth. The teeth are so shaped as to provide, in the typical case, a separation between adjacent teeth which is about twice the face width thereof.

The inward-facing surface of the outer stator ring 14 is similarly toothed at 38, at least in the axial region corresponding to the rotor teeth 36. The stator body has at least one slot 40 extending through its outer ring, through which the leads 42 of the winding are passed, as shown. From the dashed flux-path lines shown in FIG. 2, the very "tight" magnetic coupling between rotor and stator can be appreciated. The single working gap of the unit is that existing between the rotor teeth and the stator teeth, and this gap is actually the aggregate of 30 such gaps connected in parallel (from the magnetic-circuit viewpoint), so that the gap area is relatively very large, and its effective gap width or inter-pole spacing is very small. The minimal gap at the inside of the rotor rim is not a working gap at all, since it does not directly contribute to drive torque. Moreover, the magnetic flux passes only through the solid rim of the rotor, whereby the web portion 22 can be quite thin, and can even be perforated, to minimize the rotor inertia.

In the particular orientation of the rotor teeth relative to the stator teeth shown in FIG. 1, an impulse applied to the winding will tend to drive (pull) the rotor in the clockwise direction. The timing of succeeding impulses to maintain this directional torque may be obtained in any way desired, as by a slotted disc on the motor shaft or driven device, and a set of three photocells whose output will indicate relative tooth positions. The timing arrangement is not considered an essential feature of the present invention. If, while the rotor is moving, winding impulses are supplied in an out-of-phase relation to those used to accelerate the rotor, deceleration will occur, and thereafter if a steady current is applied to the winding when the rotor speed is below a certain value, locking or indexing of the rotor position will result when the rotor teeth and stator teeth are centered with respect to one another. It may be noted that the presence of slot 40 in the rotor body will tend to break up and eddy currents that might undesirably reduce the speed of response to drive current pulses.

FIGURE 3 VARIATION

Figure 3:
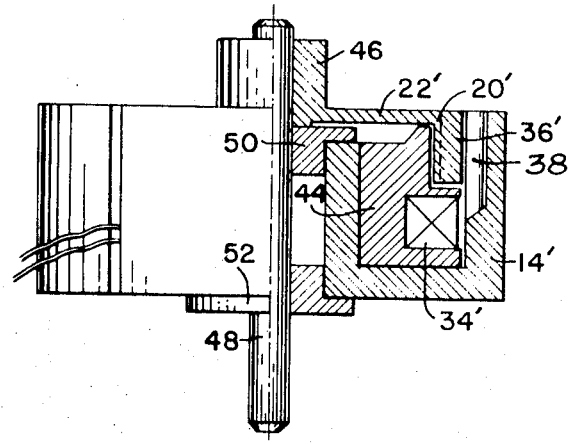
FIG. 3 is a view similar to FIG. 2 of a modified form of unit.

In FIG. 3, the radial thickness of the rotor rim 20' has been reduced to a dimension just sufficient to support the rotor teeth 36', so as to further reduce the rotor inertia. If this were to be done in FIG. 2, the resulting width of the annular recess or well of the stator would prevent the insertion of a coil winding of suitable dimensions. Therefore, the stator has been made in two parts, the inner soft iron pole piece 44 having the coil 34' wound directly upon it (for improved heat dissipation also), and being press-fitted into place within the stator body, as shown. The rotor can then be fitted, the rotor having a hub 46 with a hardened steel pin 48 serving as rotor shaft, being journalled in sintered metal bearings 50, 52 which are pressed into the stator central opening. Obviously, other materials can be used for shaft and bearings, or the construction may be like FIGS. 1 and 2. The parts of FIG. 3 which correspond generally to those already described have been designated by the same numerals, with added prime marks for differentiation.

It should be noted that the use of a two-part stator as just described adds, in effect, another gap (although a press-fitted contact one) to the magnetic circuit, and thus somewhat reduces the output torque available. This is offset by the fact that this form of construction permits the use of a larger cross-sectional area for the coil winding, so that any such loss in torque can generally be compensated. For maximum rotational acceleration this more expensive construction is justified. To secure a still further, but minor reduction in the rotor's moment of inertia, the web (22, 22') which supports the rotor rim can be skeletonized by perforation with large holes, or can be made in spoked form.

FIGURE 4 EMBODIMENT

FIG. 4 illustrates a typical embodiment utilizing in effect three of the rotor-stator units of FIG. 1 to achieve directional and other controls as described earlier, the tooth relationships being angularly offset. Certain of the parts which are common to the different units have been shown as made in one piece for simplicity and economy, and the three units have been designated A, B and C to minimize the need for repeated reference numerals. These units are assembled into a finned (heat sink) supporting member or casing 54 by clamping, pressing or other means, and the casing may have a dust cover 56. The rotors of units B and C are integral with a bushing 58 that receives a square shaft 60 for coupling to a driven member, and the rotor of unit A is press-fitted to the bushing as at 62. A deep annular groove 63 magnetically isolates the B and C rotors, and also of course reduces the aggregate of rotor inertia.

Likewise, the stators of units A and B share a one-piece double-ended stator body 64 which, along with the stator body of unit C, is immovably held in the casing 54 so that proper tooth-position phasing is maintained. In the particular form shown, the teeth of the three rotor units are in alignment, as obvious from a comparison of FIGS. 5, 6 and 7. The stator teeth, however, are positioned with a progressive offset (from unit to unit) corresponding to the face width of the teeth. Counter-clockwise rotation of the rotor assembly will result if the windings of the units are energized in the sequence A, C, B, A, C, B ...., while clockwise rotation will result from the sequence C, A, B, C, A, B . . ., etc., if the rotors and stators were intially indexed as shown in FIG. 6. Instantaneous magnetic polarities have been indicated by the letters N and S at a few positions, so that the drive directly can be easily visualized.

For stopping, power is first applied to the coil of the unit which has its teeth momentarily in full alignment, as in FIG. 6. This relationship is in effect signalled by the sensing device coupled to the driven member. The stopping power pulse is maintained until the teeth of that unit are in the position as shown in either FIG. 5 or FIG. 7. Power is then applied to a different unit's winding which has by that time brought its teeth into alignment. These power stopping pulses are continued until the rotor assembly has come to rest, at which time a steady indexing or holding current (of low value) is applied to the coil of the unit which has its teeth most nearly in alignment.

FIG. 8 shows a simple switching arrangement for applying power to the individual coil windings in sequence. The switches 66, 68 and 70 can be a mechanical commutator arrangement driven by the device, or they may represent an electronic switching arrangement of a type of which the prior art affords numerous examples. The switch 72 in series with power source 74 serves to short-circuit a series resistor 76 so that, when switch 72 is opened, the reduced steady holding current mentioned above will be supplied to the coil winding (such as shown for unit B) where the teeth are in alignment.

The control system may include a provision for applying reduced-current sequential pulses (following the initial accelerating pulses) in order to maintain the desired speed as the rotor moves into its new position. That is, reliance upon mere coasting of the rotor, following the acceleration period, is not a requirement of the system.

It is also not a requirement that the rotor and stator have identical numbers of teeth, as one of them may have a number of teeth that is a multiple or a submultiple of the teeth on the other.

As indicated above, the preferred embodiments employ magnetic circuit parts formed of iron of good magnetic permeability and low values of rententivity; that is, permanent magnetism is not utilized. However, the stator or rotor, or a part of one or the other, may have some degree of magnetic retentivity for aiding indexing or improving the stepping action, where the earlier-indicated disadvantages of magnetically hard materials can be tolerated. It is not my intention, therefore, to absolutely preclude the possible use of such magnetically "harder" materials.

Besides reducing the reluctance of the total magnetic circuit, the division or segmentation of the working gap into a multiplicity of like-polarity pole teeth operates to balance the radial forces on the armature or rotor shell, by reason of the circular symmetry of the force vectors. This is in contrast to motors which employ only two or three sets of poles on rotor or stator, and in which severe force imbalances always occur.

What is claimed is:

1. A rotary electromagnetic device comprising a stator having an annular groove in one end face thereof forming a generally cylindrical inner pole and a surrounding outer pole, the outer wall of said groove being serrated by a plurality of uniform inwardly facing teeth, said teeth forming extension of said outer pole, a circularly wound coil occupying a part of said groove and surrounding said inner pole, and a circular armature shell having about its periphery a plurality of uniform outwardly facing teeth, said armature shell being mounted to rotate in said groove, with said teeth on said armature shell forming extensions of said inner pole.

2. A device in accordance with claim 1, in which said armature shell is constituted by substantially a single piece of material.

3. A device in accordance with claim 1, in which said stator is constituted by substantially a single piece of material.

4. An electromagnetic device comprising a plurality of devices as defined in claim 1, with their armature shells connected for conjoint rotation.

5. An electromagnetic device in accordance with claim 4, in which the teeth of said stators or of said armature shells are angularly offset with respect to one another in the direction of rotation.

6. A rotary electromagnetic device having a single segmented working gap between its poles, comprising a stator having an annular groove in one face thereof, a coil occupying a part of said groove, the outer wall of said groove being internally toothed, and a circular rotor shell having an externally toothed periphery, said shell being mounted to rotate in said groove.

7. A device in accordance with claim 6, in which said rotor shell is constituted by substantially a single piece of material.

8. A device in accordance with claim 6, in which said stator is constituted by substantially a single piece of material.

9. An electromagnetic device comprising a plurality of devices as defined in claim 6, with their rotor shells connected for conjoint rotation.

10. An electromagnetic device in accordance with claim 9, in which the teeth of said stators or of said rotor shells are angularly offset with respect to one another in the direction of rotation.

11. An electric current-impulse actuated motor comprising a stator formed predominantly of magnetically soft material and providing radially-spaced inner and outer poles bridge by stator material at a distance from one end to define at least one generally annular space between said poles, the outer face of said inner pole adjacent the said end being smoothly cylindrical in contour and the inner face of said outer pole being radially toothed to form a plurality of pole extensions; a coil surrounding at least a portion of said inner pole within the said annular space; and a rotor having a ring-shaped portion formed predominantly of magnetically soft material disposed within said space, and having a smoothly cylindrical inner face closely adjacent the outer smooth face of the inner stator pole, and a radially-toothed outer face formed to provide a plurality of pole extensions forming, with the teeth of said inner face of the outer stator pole, a plurality of equi-angularly spaced magnetically parallel working gaps.

12. A rotary electromagnetic device comprising a stator, a coil to excite the stator, and a rotor, said stator and said rotor being closely configured in one circular region of each and being correspondingly toothed throughout another circular region thereof, to provide a single segmented working gap therebetween.

References Cited

UNITED STATES PATENTS

| 2,583,180 | 1/1952 | Krommiller et al. | 310—258 X |
| 3,005,118 | 10/1961 | Ranseen | 310—49 |
| 3,293,460 | 12/1966 | Iwai et al. | 310—49 |

FOREIGN PATENTS 446,450 3/1914 France.

WARREN E. RAY, Primary Examiner

U.S. Cl. X.R.

310—254, 266; 318—138